US012748635B2

(12) United States Patent
Arora et al.

(10) Patent No.: US 12,748,635 B2
(45) Date of Patent: Sep. 29, 2026

(54) COST MEASUREMENT AND ANALYTICS FOR OPTIMIZATION ON COMPLEX PROCESSING

(71) Applicant: Bank of America Corporation, Charlotte, NC (US)

(72) Inventors: Rahul Arora, Hyderabad (IN); Pradip Bachaspati, Gurugram (IN); Suresh Chappa, Hyderabad (IN); Mangesh Chore, Hyderabad (IN); Sunil Gaddam, Secunderabad (IN)

(73) Assignee: Bank of America Corporation, Charlotte, NC (US)

( * ) Notice: Subject to any disclaimer, the term of this patent is extended or adjusted under 35 U.S.C. 154(b) by 445 days.

(21) Appl. No.: 18/239,381

(22) Filed: Aug. 29, 2023

(65) Prior Publication Data

US 2025/0077305 A1 Mar. 6, 2025

(51) Int. Cl.
*G06F 9/50* (2006.01)
*G06F 9/455* (2018.01)
*G06F 9/48* (2006.01)

(52) U.S. Cl.
CPC ............ *G06F 9/5088* (2013.01); *G06F 9/455* (2013.01); *G06F 9/4818* (2013.01); *G06F 9/5072* (2013.01)

(58) Field of Classification Search
CPC ...... G06F 9/5088; G06F 9/455; G06F 9/4818; G06F 9/5072
USPC .......................................................... 718/105
See application file for complete search history.

(56) References Cited

U.S. PATENT DOCUMENTS

| | | | | |
|---|---|---|---|---|
| 9,300,691 | B1 * | 3/2016 | Banerjee | H04L 41/28 |
| 9,818,127 | B2 | 11/2017 | Iyoob et al. | |
| 9,955,330 | B2 | 4/2018 | Miluzzo et al. | |
| 10,496,494 | B1 * | 12/2019 | Haloi | G06F 16/148 |

(Continued)

OTHER PUBLICATIONS

Genez et al., "Estimation of the Available Bandwidth in Inter-Cloud Links for Task Scheduling in Hybrid Clouds," DOI 10.1109/TCC.2015.2469650, IEEE Transactions on Cloud Computing, 14 pages.

(Continued)

*Primary Examiner* — Adam Lee
(74) *Attorney, Agent, or Firm* — Banner & Witcoff, Ltd.

(57) ABSTRACT

Aspects of the disclosure relate to using machine learning models to automatically deploy computing workloads. A computing system may retrieve resource data. The resource data may comprise deployment costs of computing workloads that are currently deployed, indications of computing workloads that are preauthorized for automatic deployment, and indications of computing workloads that are not preauthorized for automatic deployment. Cloud service provider data indicating cloud service provider costs may be retrieved, via an application programming interface (API) connector. Based on inputting the resource data and the cloud service provider data into machine learning models, cloud deployment data may be generated. The cloud deployment data may comprise predicted deployment costs of the cloud service providers. The computing workloads that are preauthorized for automatic deployment may be deployed. Indications of predicted deployment costs may be generated for each of the computing workloads that are not preauthorized for automatic deployment.

17 Claims, 7 Drawing Sheets

(56) References Cited

U.S. PATENT DOCUMENTS

| | | | | |
|---|---|---|---|---|
| 10,673,952 | B1 * | 6/2020 | Cohen | H04L 67/10 |
| 10,853,148 | B1 * | 12/2020 | Kenney | G06F 9/4881 |
| 10,878,353 | B2 * | 12/2020 | Masters | G06F 9/5094 |
| 11,030,011 | B2 | 6/2021 | Netto et al. | |
| 11,477,275 | B1 * | 10/2022 | Mehrotra | G06F 11/2038 |
| 11,481,450 | B2 | 10/2022 | Bhargava et al. | |
| 11,621,961 | B2 | 4/2023 | He et al. | |
| 12,149,419 | B1 * | 11/2024 | Remy | G06F 11/3006 |
| 2012/0233625 | A1 * | 9/2012 | Sabin | G06F 9/45558 709/222 |
| 2012/0304179 | A1 * | 11/2012 | Devarakonda | G06Q 10/00 718/102 |
| 2013/0268940 | A1 * | 10/2013 | Gmach | G06F 9/5077 718/104 |
| 2014/0164598 | A1 * | 6/2014 | Srinivasan | H04L 41/0213 709/224 |
| 2014/0173623 | A1 * | 6/2014 | Chang | G06F 9/5094 718/105 |
| 2014/0280961 | A1 * | 9/2014 | Martinez | H04L 41/40 709/226 |
| 2015/0143366 | A1 * | 5/2015 | Suragi Math | G06F 9/5072 718/1 |
| 2015/0347183 | A1 * | 12/2015 | Borthakur | G06F 9/5088 718/105 |
| 2016/0380906 | A1 * | 12/2016 | Hodique | G06Q 30/0206 709/226 |
| 2018/0095778 | A1 * | 4/2018 | Aydelott | G06F 9/5055 |
| 2019/0281112 | A1 * | 9/2019 | Bhat | H04L 67/1097 |
| 2019/0349210 | A1 * | 11/2019 | Nayak | H04M 15/58 |
| 2020/0014609 | A1 * | 1/2020 | Hockett | H04L 67/1001 |
| 2020/0089515 | A1 * | 3/2020 | Hari | G06N 3/02 |
| 2020/0201827 | A1 * | 6/2020 | Chacko | G06F 16/1824 |
| 2020/0218579 | A1 * | 7/2020 | D M | G06F 16/24578 |
| 2020/0236169 | A1 * | 7/2020 | Vaddi | G06F 9/547 |
| 2020/0304571 | A1 * | 9/2020 | Ranjan | G06F 3/0649 |
| 2020/0334059 | A1 * | 10/2020 | Ramamoorthi | G06F 9/45558 |
| 2020/0379805 | A1 * | 12/2020 | Porter | G06F 9/5072 |
| 2021/0117307 | A1 * | 4/2021 | MacNamara | G06F 11/3433 |
| 2021/0173719 | A1 * | 6/2021 | Chester | G06F 9/455 |
| 2021/0373973 | A1 * | 12/2021 | Ekins | G06F 9/5088 |
| 2022/0012112 | A1 * | 1/2022 | Wouhaybi | G06F 11/3447 |
| 2022/0092480 | A1 * | 3/2022 | Mahadik | G06N 20/10 |
| 2022/0156661 | A1 * | 5/2022 | Xu | G06Q 20/145 |
| 2022/0188172 | A1 * | 6/2022 | Gupta | G06F 9/5077 |
| 2022/0413932 | A1 * | 12/2022 | Telang | G06F 9/505 |
| 2023/0088950 | A1 * | 3/2023 | Tadeu de Paula | G06Q 10/083 705/338 |
| 2023/0111378 | A1 * | 4/2023 | Sousa | G06N 3/088 706/21 |
| 2024/0004711 | A1 * | 1/2024 | Young, Jr. | G06F 9/5011 |
| 2024/0062069 | A1 * | 2/2024 | Jiang | G06N 3/0464 |
| 2024/0095391 | A1 * | 3/2024 | Gordon | G06F 21/6227 |
| 2024/0168796 | A1 * | 5/2024 | Sathaye | G06F 9/4856 |
| 2024/0176637 | A1 * | 5/2024 | Ahlvin | G06F 9/5027 |
| 2024/0249220 | A1 * | 7/2024 | Odibat | G06Q 10/06313 |
| 2024/0403132 | A1 * | 12/2024 | Mitran | G06F 21/53 |
| 2024/0427644 | A1 * | 12/2024 | Mishra | G06F 9/5027 |

OTHER PUBLICATIONS

Maziku et al., "Towards a Network Aware VM Migration:Evaluating the Cost of VM Migration in Cloud Data Centers," DOI: 10.1109/CloudNet.2014.6968978, 2014 IEEE 3rd International Conference on Cloud Networking (CloudNet), 7 pages.

Singer et al., "Towards a Model for Cloud Computing Cost Estimation with Reserved Instances," University of Tartu, Estonia, Proc. of 2nd Int. ICST Conf. on Cloud Computing, CloudComp 2010, 12 pages.

Cho et al., A Cost Estimation Model for Cloud Services and Applying to PC Laboratory Platforms, Processes 2020, 8, 76; doi:10.3390/pr8010076, 13 pages.

* cited by examiner

COST MEASUREMENT AND ANALYTICS FOR OPTIMIZATION ON COMPLEX PROCESSING

TECHNICAL FIELD

Some aspects of the disclosure relate to automatically perform comparative resource analysis in order to determine the cloud computing systems to which resources comprising computing workloads may be deployed. Other aspects of the disclosure pertain to the automatic intake and processing of resource data and cloud service data that may be evaluated using machine learning models that are configured to determine which computing workloads may be efficiently deployed on available cloud computing systems.

BACKGROUND

Computing resources may comprise workloads that are distributed to cloud service providers in order to offload some of the expense associated with hosting applications and data locally. The amount of processing power and storage used by an organization may vary over time and as a result, the cloud computing resources used by an organization may also vary. Further, the performance and expenses of an organization may be impacted based on the extent to which cloud computing resources are efficiently deployed. For example, the inefficient deployment of cloud computing resources that results in not having sufficient processing to run core applications may result in a host of issues that may adversely affect the performance of an organization's activities.

Further, the process of apportioning resources to cloud service providers may be arduous and require significant amounts of computational resources as well as manual intervention on the part of computing resource administrators and other personnel charged with managing cloud computing resources. Excessive manual intervention and use of computational resources may result in excessive costs and expenditure of time that may unduly tax resources that might otherwise be invested in other areas. As a result, attempting to accurately evaluate the current state and costs associated with cloud computing resources may present challenges.

SUMMARY

Aspects of the disclosure provide technical solutions to improve the effectiveness with which cloud computing resources may be analyzed and deployed.

In accordance with one or more embodiments of the disclosure, a computing system may comprise one or more processors and memory storing computer-readable instructions that, when executed by the one or more processors, may cause the computing system to retrieve resource data comprising deployment costs of one or more computing workloads that are currently deployed on one or more cloud computing systems. The one or more computing workloads may comprise one or more computing workloads that are preauthorized for automatic deployment to a plurality of cloud service providers, and one or more computing workloads that are not preauthorized for automatic deployment to the plurality of cloud service providers. The computing system may retrieve, via a cloud application programming interface (API) connector, cloud service provider data comprising provider costs of the plurality of cloud service providers. The computing system may generate, based on inputting the resource data and the cloud service provider data into one or more machine learning models, cloud deployment data comprising predicted deployment costs of the plurality of cloud service providers for each of the one or more computing workloads. The computing system may, based on the deployment costs for one or more of the plurality of cloud service providers meeting one or more criteria, deploy the one or more computing workloads that are preauthorized for automatic deployment to the one or more of the plurality of cloud service providers with the predicted deployment costs that meet the one or more criteria. Furthermore, the computing system may generate, for each of the one or more computing workloads that are not preauthorized for automatic deployment, based on the cloud deployment data, indications of the predicted deployment costs resulting from deployment to the plurality of cloud service providers.

In one or more implementations, the memory may store additional computer-readable instructions that, when executed by the one or more processors, further cause the computing system to determine, based on inputting the resource data into the one or more machine learning models, the one or more computing workloads that are preauthorized for automatic migration.

In one or more implementations, the cloud API connector is configured to perform real-time retrieval of the resource data or the cloud service provider data.

In one or more implementations, meeting the one or more criteria may comprise the predicted deployment costs being less than the deployment costs of the one or more computing workloads by a threshold amount.

In one or more implementations, the one or more machine learning models may comprise a decision tree model configured based on historical costs of deploying the one or more computing workloads to a plurality of historical cloud service providers.

In one or more implementations, the plurality of cloud service providers may comprise a plurality of computing hardware resources or computing software resources on which computing processes of the one or more computing workloads may be capable of being performed.

In one or more implementations, the one or more machine learning models may be configured to determine the one or more computing workloads that are preauthorized for automatic migration based on evaluation of whether the one or more computing workloads are critical workloads that require authorization for redeployment.

In one or more implementations, the one or more computing workloads may comprise computing processes performed on one or more physical devices of the plurality of cloud service providers or one or more virtual devices of the plurality of cloud service providers.

In one or more implementations, the memory may store additional computer-readable instructions that, when executed by the one or more processors, further cause the computing system to access deployment cost training data comprising a plurality of historical deployment costs of the plurality of cloud service providers and a plurality of historical deployments of the one or more computing workloads. The computing system may generate, based on inputting the deployment cost training data into the one or more machine learning models, a plurality of predicted deployment costs. The computing system may determine a similarity between the plurality of predicted deployment costs and a plurality of ground-truth deployment costs. The computing system may generate, based on the similarity between the plurality of predicted deployment costs and the plurality of ground-truth deployment costs, a deployment cost prediction accuracy of the one or more machine learning models. Furthermore, the computing system may adjust a weighting of one or more deployment cost prediction parameters of the one or more machine learning models based on the deployment cost prediction accuracy. The weighting of the deployment cost prediction parameters that increase the deployment cost prediction accuracy may be increased. Further, the weighting of the deployment cost prediction parameters that decrease the deployment cost prediction accuracy may be decreased.

In one or more implementations, the deployment cost prediction accuracy may be based on an amount of similarity between the plurality of predicted deployment costs and the ground-truth deployment costs.

In one or more implementations, the indications of the predicted deployment costs may comprise indications of a difference between the predicted deployment costs and the deployment costs of the one or more computing workloads that are currently deployed.

In one or more implementations, the one or more machine learning models may comprise a neural network configured to determine, based on the resource data and the cloud service provider data, migration costs for each of the plurality of cloud service providers. Further, the predicted deployment costs may comprise the migration costs for each of the plurality of cloud service providers.

In one or more implementations, the predicted deployment costs may comprise a cost of migrating the one or more computing workloads to the plurality of cloud service providers.

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
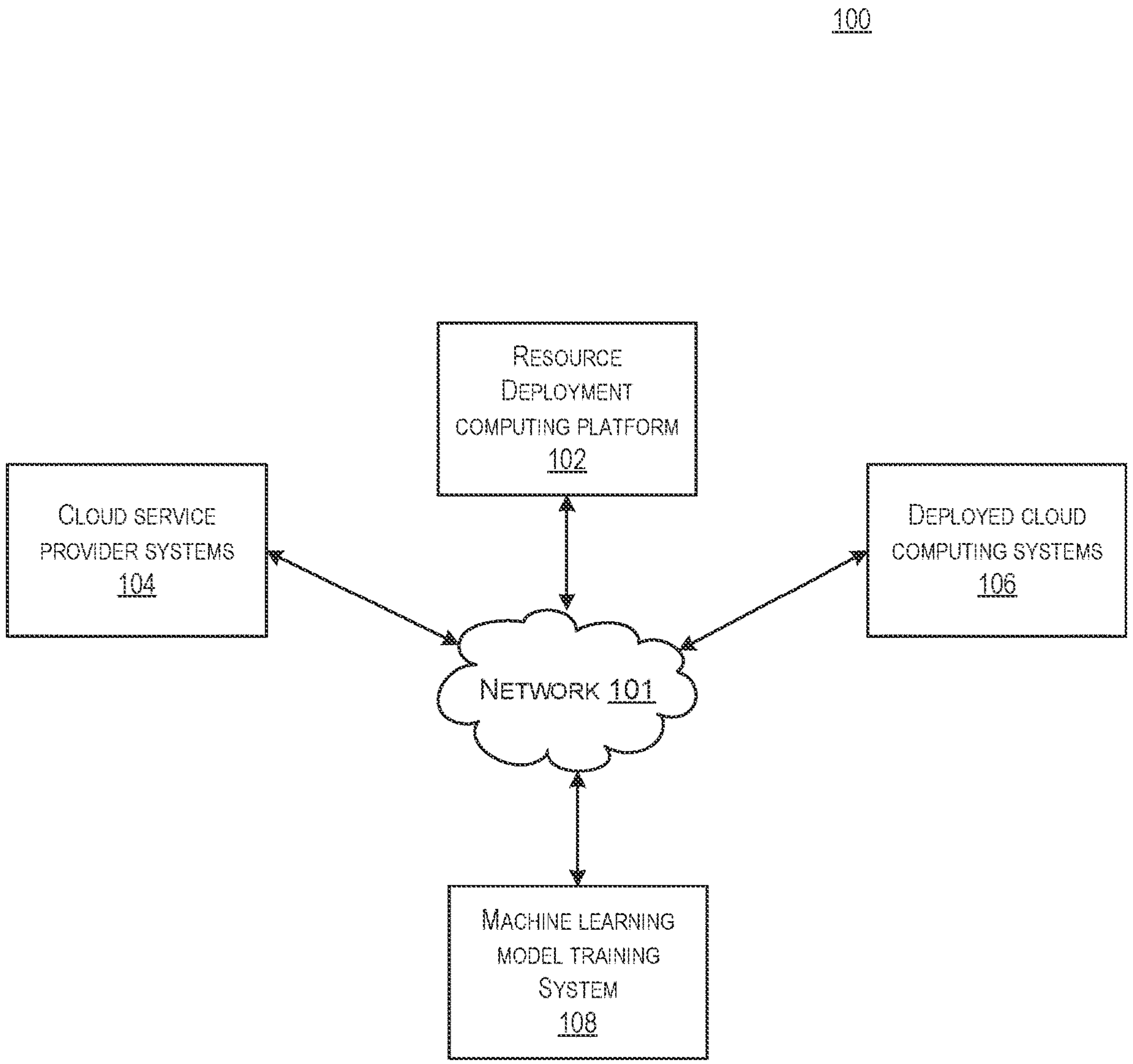
FIG. 1 depicts an illustrative computing environment for automated cloud computing workload analysis and deployment in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for performing comparative resource analysis (e.g., real-time cost analysis) of cloud computing platforms so that workloads may be migrated and deployed on to the cloud computing platforms. Deployment of workloads may be based on the cloud computing platforms that may provide advantages with respect to various factors including cost. The disclosed technology may leverage the use of artificial intelligence (e.g., machine learning models) to analyze cloud computing platforms and determine pre-authorized resources (e.g., resources comprising computing workloads that were previously authorized for automatic deployment) that may be automatically migrated to cloud computing platforms determined by the machine learning models. Further, based on the analysis of the cloud computing platforms the disclosed technology may provide an analysis of a selected group of cloud computing platforms that may provide advantages (e.g., cost advantages) over the cloud computing platforms that are currently being used. Further, a visualization (e.g., charts and/or graphs) and/or analytics indicating the advantages of the selected group of cloud computing platforms over the cloud computing platforms that are currently being used may be generated.

Determining a cloud computing platforms to which existing workloads may be migrated may be performed on an ad hoc basis. However, migrating workloads on an ad hoc basis may prove costly and involve a significant expenditure of time, especially when the decision making process is not automated. However, automation of migrations may create the risk that key resources (e.g., mission critical resources) may be migrated to a cloud computing platform at an inopportune moment that may be costly. To address potential issues associated with ad hoc migration, automated migration of cloud computing resources and other issues, the disclosed technology may provide an artificial intelligence (e.g., machine learning model) algorithm based cloud computing platform migration process that may be used to improve the analysis of cloud computing platform costs and migration of workloads. In particular, the disclosed technology may automatically migrate pre-approved migration qualified resources and for resources that are not pre-approved, may generate a migration analysis that may comprise an analysis of the benefits of a selected group of cloud computing platforms compared to the cloud computing platforms on which resources are currently deployed.

For example, a computing system may access and/or analyze resource data that may comprise information about currently deployed cloud computing resources that are being used as well as the costs and other information associated with those resources. The current cloud computing resources may be associated with workloads that may comprise pre-authorized migration qualified resources that may be associated with non-critical workloads that may be automatically migrated to a different cloud computing platform.

Further, the current cloud computing resources may be associated with workloads that may comprise critical resources that may be associated with critical workloads that may not be automatically migrated to a different cloud computing platform and which may require further approval before being deployed and/or migrated. In some embodiments, the resource data and/or cloud service provider data may be stored in one or more databases (e.g., SQL databases) that may be accessed locally and/or remotely.

Further, the one or more databases may comprise a resource migration classification database. Additionally, the computing system may access and/or analyze cloud service provider data from a plurality of cloud service providers. The cloud service provider data may comprise information about the availability of cloud computing resources (e.g., processing resources and/or storage resources) and/or costs. The resource data and/or the cloud service provider data may comprise information associated with the hardware and/or software configurations and/or capabilities of deployed resources and/or resources available from cloud computing providers. Further, resource data and/or cloud service provider data may be accessed based on the use of APIs (e.g., cloud APIs) that may be used to access data on a continuous basis.

Based on inputting the resource data and the cloud service provider data into one or more machine learning models, one or more selected cloud computing platforms that provide advantages (e.g., cost advantages) over the cloud computing platforms that are currently being used may be determined. Further, the one or more machine learning models may provide detailed analysis of costs on a resource by resource basis (e.g., individual hardware and/or software resources). Costs may comprise the costs of deploying resources, costs associated with the migration process (e.g., downtime), and/or other costs. The one or more machine learning models may comprise neural networks and/or decision tree models. Further, the one or more machine learning models may be trained based on analysis of historical resource data and/or historical cloud service provider data. Based on the one or more selected cloud computing platforms that were determined, pre-authorized migration qualified resources may be automatically migrated to the one or more selected cloud computing platforms that were determined. Further, a migration analysis comprising an analysis of the benefits and/or costs associated with the one or more selected cloud computing platforms may be generated for use with respect to the critical resources that were not automatically migrated.

The use of these techniques may result in a variety of benefits and advantages including a reduction in the time used to perform comparative resource cost analysis and/or more effective performance of comparative resource cost analysis through use of machine learning models. Additionally, the disclosed technology may provide cost savings as well as improved cloud computing platform resource usage.

FIG. 1 depicts an illustrative computing environment for automated cloud computing workload analysis and deployment in accordance with one or more aspects of the disclosure. Referring to FIG. 1, computing environment 100 may include one or more computing systems. For example, computing environment 100 may include resource deployment computing platform 102, cloud service provider systems 104, deployed cloud computing systems 106, and/or machine learning model training system 108.

As described further below, resource deployment computing platform 102 may comprise a computing system that includes one or more computing devices (e.g., computing devices comprising one or more processors, one or more memory devices, one or more storage devices, and/or communication interfaces) that may be used to analyze currently deployed computing workloads (e.g., workloads that implement computing processes including the operation of computing applications such as computing software applications). For example, the resource deployment computing platform 102 may be configured to implement one or more machine learning models that may be configured and/or trained to retrieve resource data and/or cloud service provider data from a database, generate cloud deployment data (e.g., data indicating costs and/or ability to deploy computing workloads to cloud service providers), deploy computing workloads (e.g., preauthorized computing workloads) to cloud service providers, and/or generate indications of predicted deployment costs to deploy workloads (e.g., workloads that are not preauthorized to be automatically deployed to cloud service providers).

In some implementations, the resource deployment computing platform 102 may transmit data (e.g., a request to access cloud service provider data) that may be used to access information (e.g., resource data and/or cloud service provider data) associated with the cloud service provider systems 104 and/or the deployed cloud computing systems 106 which may comprise one or more computing devices on which computing workloads may be deployed. The data transmitted by the resource deployment computing platform 102 may be transmitted to cloud service provider systems 104 and/or deployed cloud computing systems 106. Cloud service provider systems 104 may be configured to grant access to the resource deployment computing platform 102. For example, authorization to migrate computing workloads from the deployed cloud computing systems 106 to the cloud service provider systems 104 may be restricted to an authorized user of the resource deployment computing platform 102 (e.g., an administrator with permission to access and/or deploy workloads to the cloud service provider systems 104). Further, the resource deployment computing platform may be configured to access the cloud service provider systems 104 and/or the deployed cloud computing systems 106 via an API connector that may be used to retrieve data including the costs of operating workloads on the cloud service provider systems 104 and/or the deployed cloud computing systems 106.

Communication between the resource deployment computing platform 102, cloud service provider systems 104, deployed cloud computing systems 106, and/or the machine learning model training system 108 may be encrypted. In some embodiments, the resource deployment computing platform 102 may access one or more computing devices and/or computing systems remotely. For example, the resource deployment computing platform 102 may remotely access the cloud service provider systems 104, the deployed cloud computing systems 106, and/or the machine learning model training system 108.

Cloud service provider systems 104 may comprise one or more computing devices and/or one or more computing systems on which one or more computing workloads may be processed and/or executed. Further, usage of the cloud service provider systems 104 may be based on access granted to the resource deployment computing platform 102. For example, one or more cloud computing resources (e.g., storage and/or processing resources) may be used by computing workloads deployed by the resource deployment computing platform 102. The cloud service provider systems 104 may comprise different computing devices and/or computing systems that may provide different capabilities (e.g., faster processing, greater storage, and/or lower communication latency). The cloud service provider systems 104 may be configured to be accessed via an API connector that may be used to retrieve data including the costs of operating workloads on the cloud service provider systems 104.

The cloud service provider systems 104 may be located at a different physical location than the resource deployment computing platform 102 and/or the deployed cloud computing systems 106. Although a single instance of the cloud service provider systems 104 is shown, this is for illustrative purposes only, and any number of cloud service provider systems may be included in the computing environment 100 without departing from the scope of the disclosure.

Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDS, and/or RAM), and/or a communication interface that may be used to send and/or receive data and/or perform operations including determining whether to grant access to a cloud computing device of a cloud service provider (e.g., a device included in cloud service provider systems 104. For example, the deployed cloud computing systems 106 may receive, from the resource deployment computing platform 102, a request for information regarding the costs of migrating computing workloads from deployed cloud computing systems 106 to the cloud service provider systems 104.

In some implementations, deployed cloud computing systems 106 may include workloads that may be deployed to cloud service provider systems 104. In particular, deployed cloud computing systems 106 may comprise one or more processing devices and/or one or more storage devices as described herein. Further, deployed cloud computing systems 106 may include computing workloads that may be migrated to cloud service provider systems 104. The deployed cloud computing system 106 may be configured to be accessed via an API connector that may be used to retrieve data including the costs of operating workloads on the deployed cloud computing system 106.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more training instructions deploying and/or migrating computing workloads. One or more machine learning models stored and/or trained on the machine learning model training system 108 may include the one or more machine learning models on the resource deployment computing platform 102. Further, the one or more machine learning models of the resource deployment computing platform 102 may be trained and/or updated by the machine learning model training system 108.

Computing environment 100 may include one or more networks, which may interconnect the resource deployment computing platform 102, cloud service provider systems 104, deployed cloud computing systems 106, and/or machine learning model training system 108. For example, computing environment 100 may include a network 101 which may interconnect, e.g., resource deployment computing platform 102, cloud service provider systems 104, deployed cloud computing systems 106, and/or machine learning model training system 108. In some instances, the network 101 may be a 5G data network, and/or other data network.

In one or more arrangements, resource deployment computing platform 102, cloud service provider systems 104, deployed cloud computing systems 106, and/or machine learning model training system 108 may comprise one or more computing devices capable of sending and/or receiving data (e.g., resource data and/or cloud service provider data) and processing the data accordingly. For example, resource deployment computing platform 102, cloud service provider systems 104, deployed cloud computing systems 106, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components. Further, any combination of resource deployment computing platform 102, deployed cloud computing systems 106, and/or machine learning model training system 108 may, in some instances, be special-purpose computing devices configured to perform specific functions. For example, resource deployment computing platform 102 may comprise one or more application specific integrated circuits (ASICs) that are configured to process resource data and/or cloud service provider data, implement one or more machine learning models, deploy computing workloads, and/or generate indications of predicted deployment costs.

Figure 2:
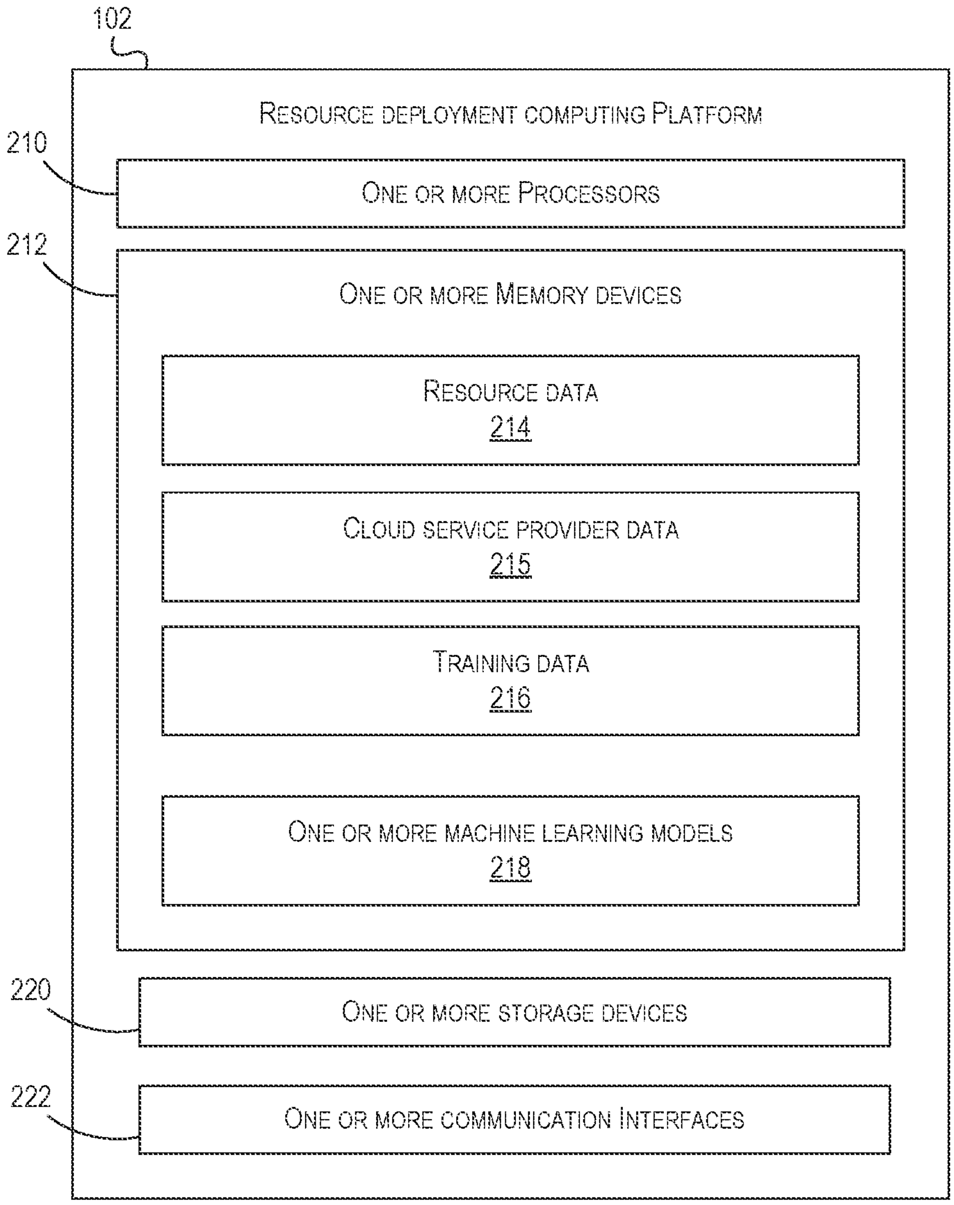
FIG. 2 depicts an illustrative computing platform for automated cloud computing workload analysis and deployment in accordance with one or more aspects of the disclosure.

FIG. 2 depicts an illustrative computing platform for automated cloud computing workload analysis and deployment in accordance with one or more aspects of the disclosure. Resource deployment computing platform 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between resource deployment computing platform 102 and one or more networks (e.g., network 101, or the like). One or more communication interfaces 222 may be communicatively coupled to the one or more processor 210. The memory may include one or more program modules having instructions that when executed by one or more processor 210 may cause the resource deployment computing platform 102 to perform one or more functions described herein and/or access data that may store and/or otherwise maintain information which may be used by such program modules and/or one or more processors 210. The one or more memory devices 212 may comprise RAM. In some instances, the one or more program modules and/or databases may be stored by and/or maintained in different memory units of resource deployment computing platform 102 and/or by different computing devices that may form and/or otherwise make up resource deployment computing platform 102. For example, the memory may have, host, store, and/or include resource data 214, cloud service provider data 215, training data 216, and/or one or more machine learning models 218. One or more storage devices 220 (e.g., solid state drives and/or hard disk drives) may also be used to store data including the resource data 214 and/or the cloud service provider data 215. The one or more storage devices 220 may comprise non-transitory computer readable media that may store data when the one or more storage devices 220 are in an active state (e.g., powered on) or an inactive state (e.g., sleeping or powered off).

Resource data 214 may comprise data that indicates the state of one or more computing workloads (e.g., computing workloads that are currently deployed on deployed cloud computing systems 106). The state of the one or more computing workloads may comprise one or more deployment costs associated with deploying the one or more computing workloads and/or one or more energy costs associated with deploying the one or more computing workloads. For example, the resource data 214 may comprise indications of the deployment costs (e.g., monetary costs and/or energy costs) of deploying the one or more computing workloads. Further, the resource data may comprise indications of the computing workloads that are preauthorized for automatic deployment to a plurality of cloud service providers, and one or more computing workloads that are not preauthorized for automatic deployment to the plurality of cloud service providers. For example, some low priority computing workloads may be preauthorized for automated deployment to a different cloud service provider. Other high priority computing workloads may require further authorization (e.g., authorization from an entity authorized to deploy computing workloads to a different cloud service provider).

Cloud service provider data 215 may comprise data that indicates the state of a plurality of cloud service providers (e.g., cloud service provider systems 104) to which one or more computing workloads may be deployed (e.g., migrated from the deployed cloud computing systems 106 to cloud service provider systems 104). The state of the plurality of cloud service providers may comprise one or more deployment costs associated with deploying the one or more computing workloads to the cloud service providers. For example, the cloud service provider data 215 may comprise indications of the deployment costs (e.g., monetary costs) of deploying one or more computing workloads to the plurality of cloud service providers. Further, the cloud service provider data may indicate a capacity and/or capabilities (e.g., processing capabilities, storage capacity, and/or communications latency) of cloud computing devices provided by the plurality of cloud service providers.

Training data 216 may comprise historical data about the computing workloads and/or cloud service providers. For example, training data 216 may comprise a plurality of historical deployment costs of the plurality of cloud service providers and/or a plurality of historical deployments of the one or more computing workloads. Training data 216 may be used to train one or more machine learning models (e.g., machine learning models 218). Further, training data 216 may be modified (e.g., some historical data may be added, deleted, and/or changed) over time. For example, new resource data and/or new cloud service provider data may be used to update the training data 216.

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate resource data 214 and/or cloud service provider data 215. Further, the one or more machine learning models 218 may generate output including a determination of which computing workloads may be deployed to cloud service providers, deployment costs associated with deploying computing workloads, and/or a deployment cost prediction accuracy indicating the accuracy of one or more machine learning models generation of cloud deployment data as described herein. Further, one or more machine learning models 218 may comprise one or more instructions that direct and/or cause the resource deployment computing platform 102 to access the resource data 214, access the cloud service provider data 215, and/or perform other functions. Further, one or more machine learning models 218 may comprise a machine learning model that comprises one or more instructions to generate cloud deployment data comprising predicted deployment costs as described herein.

Figure 3:
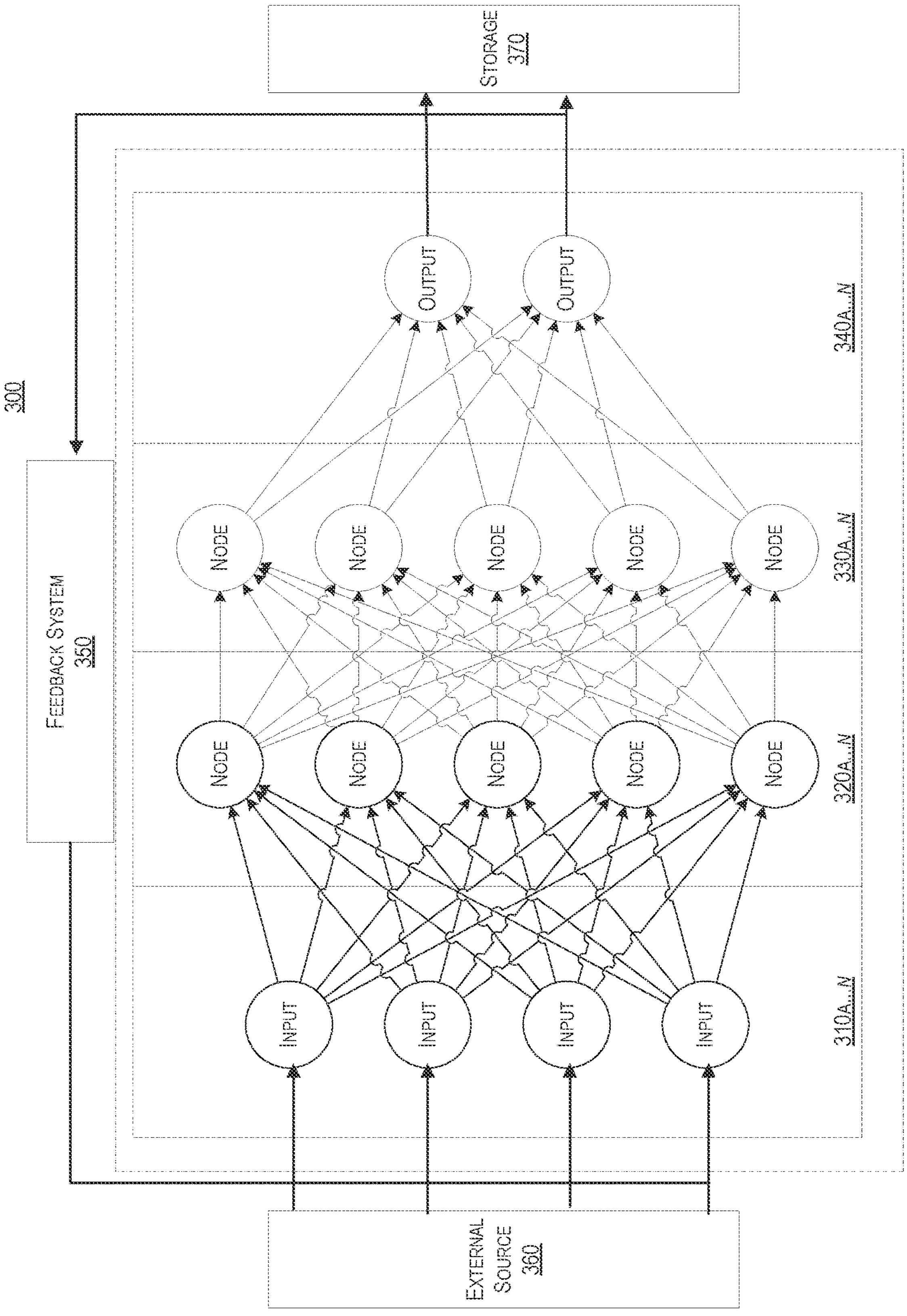
FIG. 3 depicts nodes of an illustrative artificial neural network on which a machine learning algorithm may be implemented in accordance with one or more aspects of the disclosure.

FIG. 3 depicts nodes of an illustrative artificial neural network on which a machine learning algorithm may be implemented in accordance with one or more aspects of the disclosure. In FIG. 3, each of input nodes 310*a-n* may be connected to a first set of processing nodes 320*a-n*. Each of the first set of processing nodes 320*a-n* may be connected to each of a second set of processing nodes 330*a-n*. Each of the second set of processing nodes 330*a-n* may be connected to each of output nodes 340*a-n*. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310*a-n* may originate from an external source 360. Output may be sent to a feedback system 350 and/or to storage 370. The feedback system 350 may send output to the input nodes 310*a-n* for successive processing iterations with the same or different input data.

In one illustrative method using feedback system 350, the system may use machine learning to determine an output. The output may include cloud deployment data used to determine which computing workloads may be deployed to cloud service providers, deployment costs associated with deploying computing workloads, a deployment cost prediction accuracy indicating the accuracy of one or more machine learning models generation of cloud deployment data, regression output, confidence values, and/or classification output. The system may use any machine learning model including one or more generative adversarial networks (GANs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting-regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310*a-n* may comprise logical inputs of different data sources, such as one or more data servers. The processing nodes 320*a-n* may comprise parallel processes executing on multiple servers in a data center. And, the output nodes 340*a-n* may be the logical outputs that ultimately are stored in results data stores, such as the same or different data servers as for the input nodes 310*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310*a-n* may be processed through processing nodes, such as the first set of processing nodes 320*a-n* and the second set of processing nodes 330*a-n*. The processing may result in output in output nodes 340*a-n*. As depicted by the connections from the first set of processing nodes 320*a-n* and the second set of processing nodes 330*a-n*, processing may comprise multiple steps or sequences. For example, the first set of processing nodes 320*a-n* may be a rough data filter, whereas the second set of processing nodes 330*a-n* may be a more detailed data filter.

The artificial neural network 300 may be configured to effectuate decision-making. As a simplified example for the purposes of explanation, the artificial neural network 300 may be configured to generate data (e.g., cloud deployment data) and/or instructions (e.g., instructions to deploy one or more workloads to cloud service providers). The input nodes 310*a-n* may be provided with resource data based on deployed computing workloads and/or cloud service provider data that indicates available cloud service providers and the costs of deploying workloads to the cloud service providers. The first set of processing nodes 320*a-n* may be each configured to perform specific steps to analyze the resource data, such as determining the current costs of deploying workloads. The second set of processing nodes 330*a-n* may be each configured to determine the costs of deploying workloads to available cloud service providers. Multiple subsequent sets may further refine this processing, each looking for further more specific tasks, with each node performing some form of processing which need not necessarily operate in the furtherance of that task. The artificial neural network 300 may then execute or cause to be executed operations that deploy workloads to cloud service providers and/or generate indications of deployment costs for deploying workloads to cloud service providers.

The feedback system 350 may be configured to determine the accuracy of the artificial neural network 300. Feedback may comprise an indication of similarity between the value of an output generated by the artificial neural network 300 and a ground-truth value. For example, in the resource data and cloud service provider data analysis example provided above, the feedback system 350 may be configured to determine deployment cost prediction accuracy values that are generated for multiple portions of resource data and/or cloud service provider data. The feedback system 350 may already have access to the ground-truth data (e.g., the lowest available cloud service providers), such that the feedback system may train the artificial neural network 300 by indicating the accuracy of the output generated by the artificial neural network 300. The feedback system 350 may comprise human input, such as an administrator indicating to the artificial neural network 300 whether it made a correct decision. The feedback system may provide feedback (e.g., an indication of whether the previous output was correct or incorrect and/or an extent to which the predicted deployment costs are similar to the ground-truth deployment cost values) to the artificial neural network 300 via input nodes 310*a-n* or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to analyze and/or validate resource data and/or cloud service provider data, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Additionally or alternatively, the node may be reconfigured to process resource data and/or cloud service provider data differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning.

In some implementations, the artificial neural network 300 may receive input including one or more input features. The one or more input features may comprise information associated with a number and/or type of computing workloads, an amount of processing being performed by the computing workloads, costs associated with currently deployed workloads, an availability of cloud service providers, a capacity of cloud service providers, security capabilities of cloud service providers, costs of cloud service providers, and/or access privileges of computing workloads.

Figure 4:
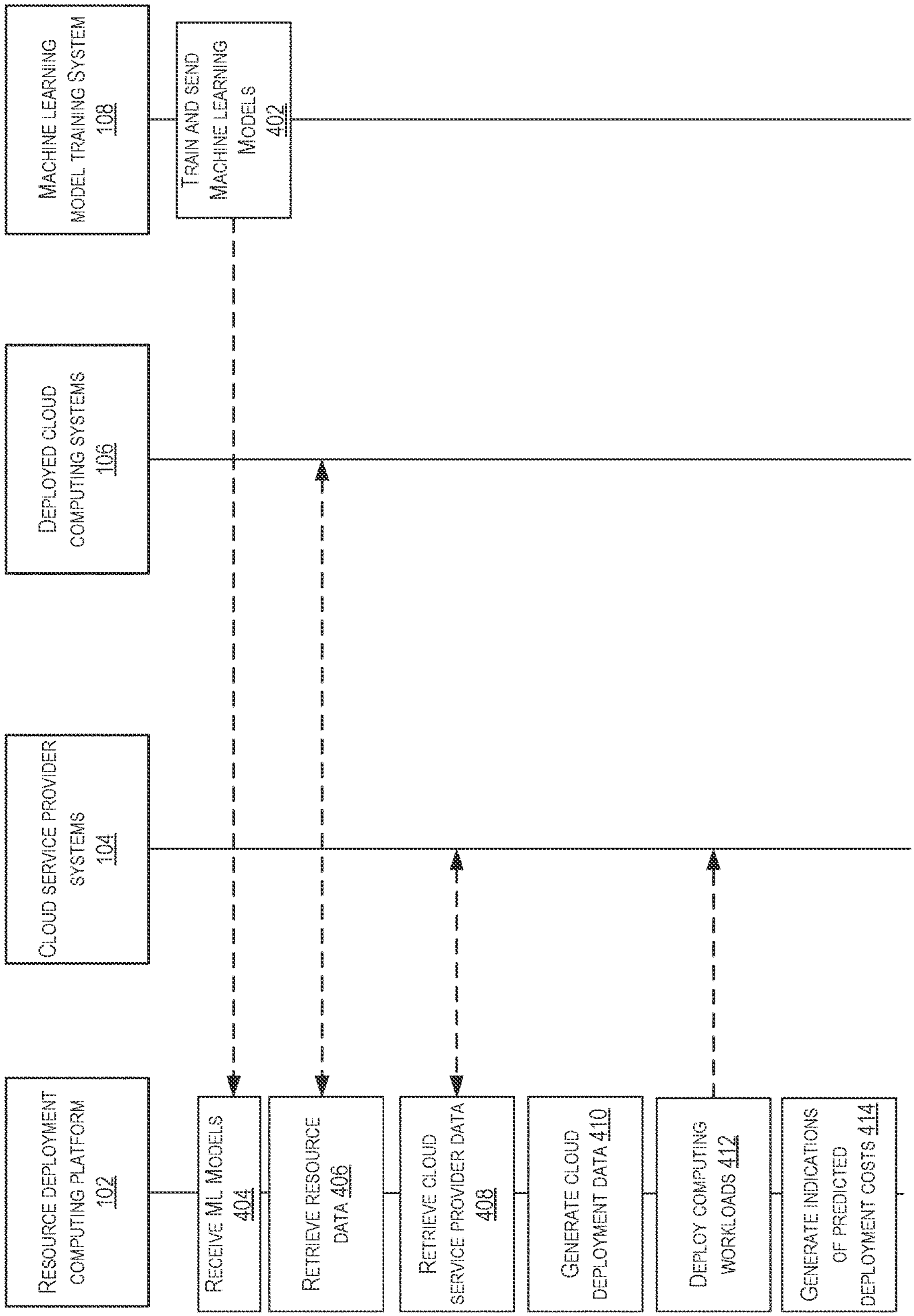
FIG. 4 depicts an illustrative event sequence for automated computing workload analysis and deployment in accordance with one or more aspects of the disclosure.

FIG. 4 depicts an illustrative event sequence for automated computing workload analysis and deployment in accordance with one or more aspects of the disclosure. Referring to FIG. 4, at step 402, a machine learning model training system 108 may train one or more machine learning models to generate cloud deployment data that may be used to deploy computing workloads to cloud service provider systems 104 and/or determine deployment costs associated with deploying computing workloads to the cloud service provider systems 104. The machine learning model training system may then send the trained machine learning models to resource deployment computing platform 102. In some embodiments, resource deployment computing platform 102 may periodically establish a data connection with the machine learning model training system 108 in order to receive up to date copies of one or more machine learning models (e.g., the one or more machine learning models 218 described with respect to FIG. 2 and/or the artificial neural network 300 that is described with respect to FIG. 3) that may be used to generate and/or use cloud deployment data as described herein. In some instances, the machine learning model training system 108 may determine whether the resource deployment computing platform 102 has an updated copy of the one or more machine learning models and may send an indication to the resource deployment computing platform 102 if an update is not warranted at that time.

At step 404, the resource deployment computing platform 102 may receive the one or more machine learning models and if necessary perform an update of the one or more machine learning models stored on the resource deployment computing platform 102. The one or more machine learning models may be implemented by the resource deployment computing platform 102.

At step 406, the resource deployment computing platform 102 may retrieve resource data from deployed cloud computing systems 106. Retrieval of the resource data may be based on a request access and retrieve data from deployed cloud computing systems 106. As described herein, the resource data may indicate computing workloads deployed on deployed cloud computing systems 106 and/or the costs associated with deploying the computing workloads on deployed cloud computing systems 106.

At step 408, the resource deployment computing platform 102 may retrieve cloud service provider data from deployed cloud computing systems 106. Retrieval of the cloud service provider data may be based on a request to access and retrieve data from cloud service provider systems 104. As described herein, the cloud service provider data may the availability, capacity, and/or deployment costs associated with the cloud service provider systems 104.

At step 410, the resource deployment computing platform 102 may use the one or more machine learning models to perform operations on the resource data retrieved from deployed cloud service provider systems 104 and/or cloud service provider data retrieved from cloud service provider systems 104. Based on the operations performed by resource deployment computing platform 102, cloud deployment data may be generated. The cloud deployment data may be used to determine deployment costs associated with the cloud service providers, which computing workloads may be deployed to the cloud service providers, and indications of predicted deployment costs resulting from deployment to the cloud service provider systems 104.

At step 412, the resource deployment computing platform 102 may perform operations to deploy the computing workloads to the cloud service providers. The operations to deploy the computing workloads may comprise migrating some of the computing workloads that were preauthorized for automatic deployment from deployed cloud computing systems 106 to cloud service provider systems 104.

At step 414, the resource deployment computing platform 102 may generate indications of predicted deployment costs resulting from deployment to the cloud service provider systems 104. The indications of the predicted deployment costs resulting from deployment to the cloud service provider systems 104 may comprise monetary deployment costs, energy costs, and/or an estimated amount of time that may be used to deploy the computing workloads. The resource deployment computing platform 102 may comprise a display on which a user interface (e.g., the interface 502 described with respect to FIG. 5) indicating the predicted deployment costs may be generated.

Figure 5:
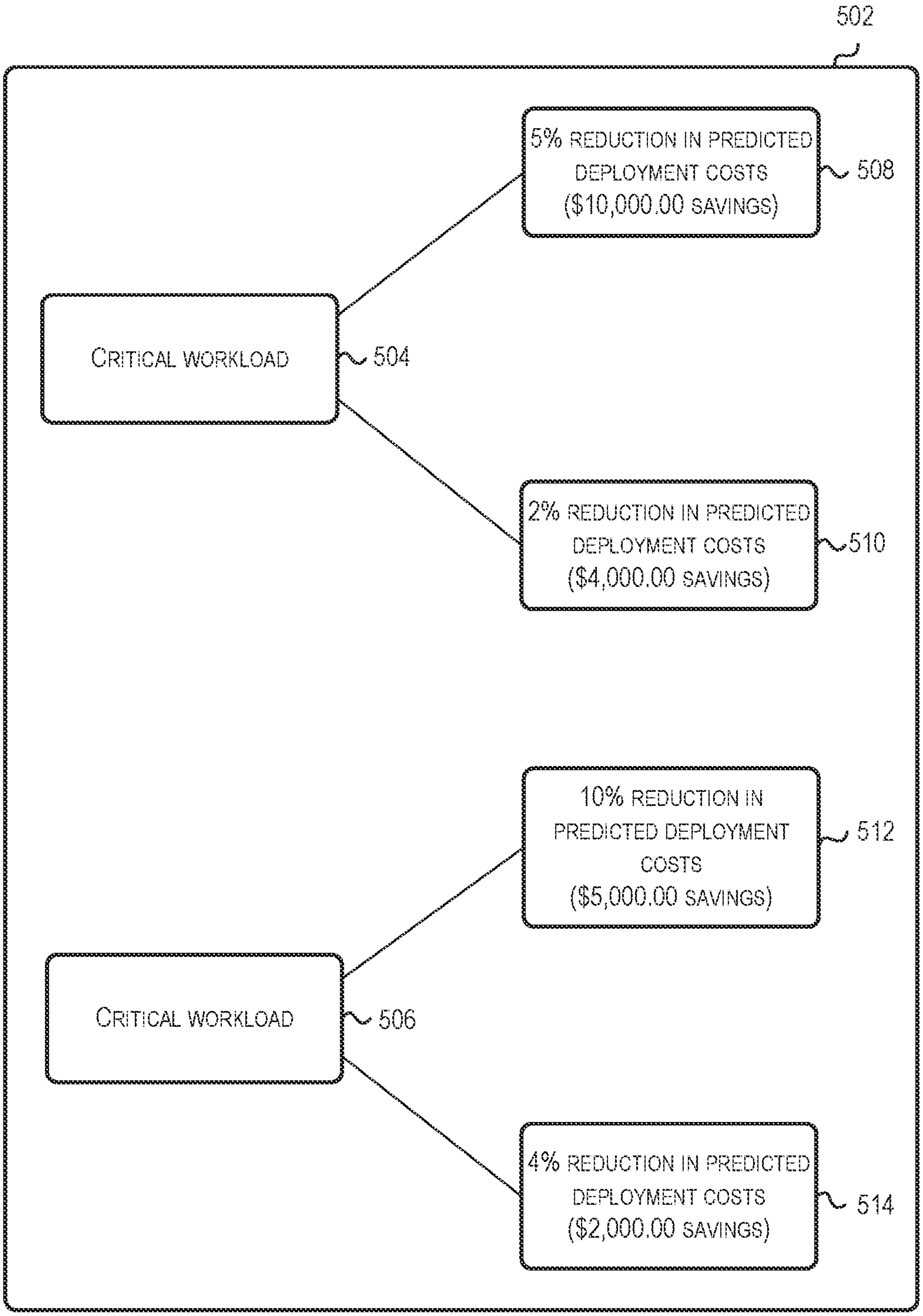
FIG. 5 depicts an illustrative interface comprising indications of predicted deployment costs in accordance with one or more aspects of the disclosure.

FIG. 5 depicts an illustrative interface comprising indications of predicted deployment costs in accordance with one or more aspects of the disclosure. The interface 502 may be implemented on the computing devices and/or computing systems described herein including the resource deployment computing platform 102 described with respect to FIG. 1. Referring to FIG. 5, interface 502 (e.g., a user interface implemented on a display device) may display the workloads 504 and 510 (e.g., critical workloads); and cloud service providers 508-514. Workloads 504 and 506 may comprise computing workloads that are critical to the performance of high value operations (e.g., significant computing processes including billing, payroll, and/or high value consumer operations). Further, workloads 506 and 506 may have been determined not to be preauthorized for automatic deployment to a cloud service provider. For example, workloads 504 and 506 may require authorization from an authorized entity (e.g., a manager or administrator of computing workloads) before being deployed to a cloud service provider (e.g., deployed to computing devices of cloud service providers).

In this example, workload 504 may be associated with cloud service providers 508 and 510. Cloud service provider 508 may be predicted to reduce deployment costs of workload 504 by five percent which may result in savings of $10,000.00. Further, cloud service provider 510 may be predicted to reduce deployment costs of workload 504 by two percent which may result in savings of $4,000.00. In some embodiments, the reduction in deployment costs and/or savings from deploying on a cloud service provider may represented by one or more images (e.g., graphs and/or charts).

Further, workload 506 may be associated with cloud service providers 512 and 514. Cloud service provider 512 may be predicted to reduce deployment costs of workload 506 by ten percent which may result in savings of $5,000.00. Further, cloud service provider 514 may be predicted to reduce deployment costs of workload 506 by four percent which may result in savings of $2,000.00. The deployment costs of deploying the workload 506 on cloud service providers 512 or 514 may be less than the deployment costs of deploying the workload 506 on cloud service providers 508 or 510. As a result, the computing systems may generate cloud deployment data that indicates that cloud service providers 512 or 514 may reduce deployment costs of workload 506 by an amount that is greater than the predicted reduction of deployment costs if cloud service providers 508 or 510 were used.

Figure 6:
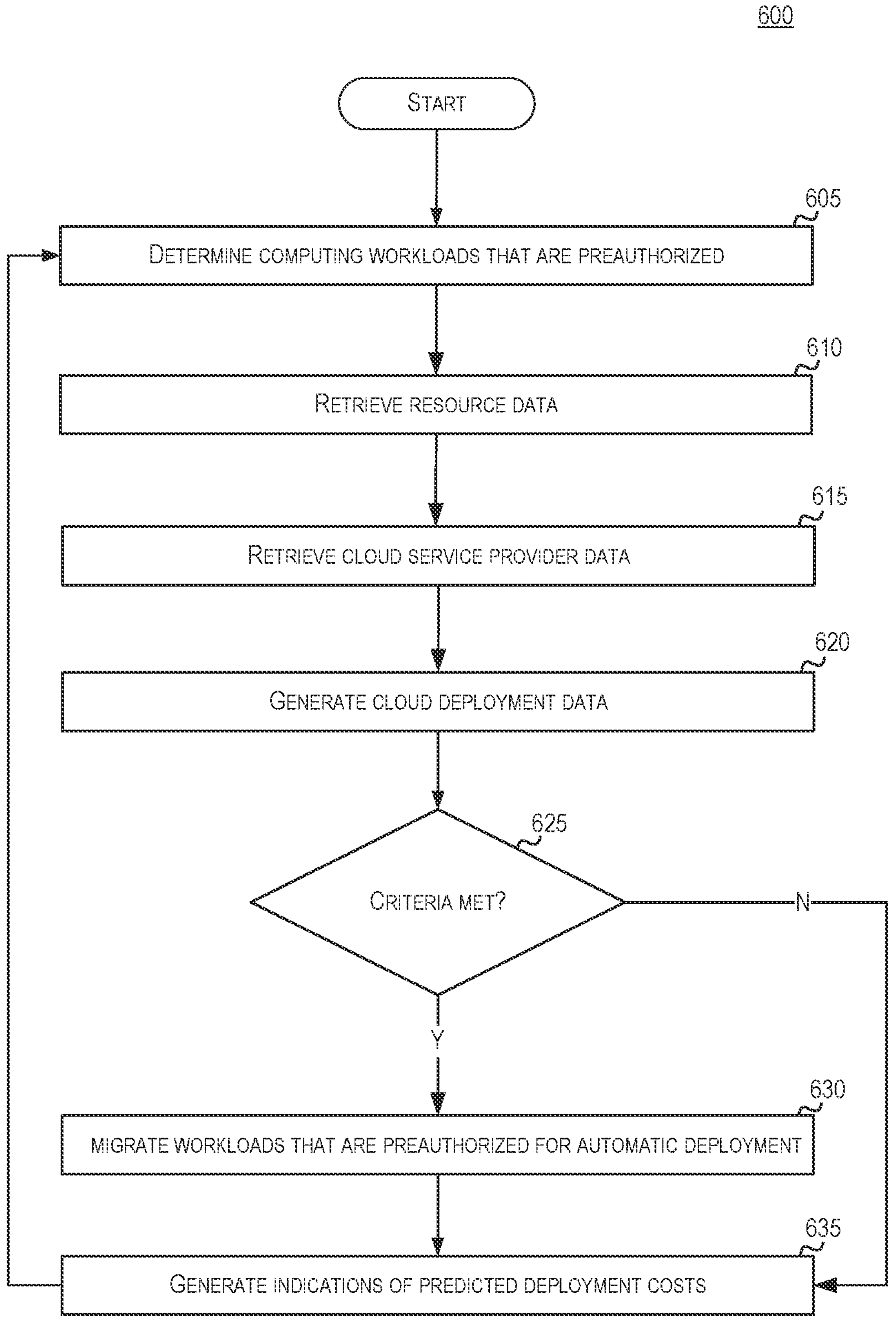
FIG. 6 depicts an illustrative method for automatically analyzing and deploying computing workloads in accordance with one or more aspects of the disclosure.

FIG. 6 depicts an illustrative method for automatically analyzing and deploying computing workloads in accordance with one or more aspects of the disclosure. The steps of a method 600 for automatically analyzing and deploying computing workloads may be implemented by a computing device or computing system (e.g., the resource deployment computing platform 102) in accordance with the computing devices and/or computing systems described herein. One or more of the steps described with respect to FIG. 6 may be omitted, performed in a different order, and/or modified. Further, one or more other steps (e.g., the steps described with respect to FIG. 7) may be added to the steps described with respect to FIG. 6.

At step 605, a computing system may determine, based on inputting the resource data into one or more machine learning models, one or more computing workloads that are preauthorized for automatic migration. The determination of the one or more computing workloads that are preauthorized for automatic migration may be based on evaluation of whether the one or more computing workloads are critical workloads that require authorization for redeployment computing workloads and/or are not critical to the operation of an organization. For example, the one or more workloads that are preauthorized for automatic migration may comprise one or more workloads that may be offline for extended periods of time without significantly impacting the performance of computing processes that are critical to an organization (e.g., transactions involving billing and/or the operation of key computing software applications). For example, the resource deployment computing platform 102 may input the resource data into one or more machine learning models 218, which may be configured and/or trained to determine one or more computing workloads that are preauthorized for automatic migration. Indications of the one or more computing workloads that are preauthorized for automatic migration may be generated in the resource data.

At step 610, a computing system may retrieve resource data. The resource data may be retrieved via a cloud API connector. The cloud API connector may be configured to perform real-time retrieval of the resource data. The resource data may comprise deployment costs of one or more computing workloads that are currently deployed on one or more cloud computing systems. The one or more computing workloads may comprise computing processes performed on one or more physical devices of the plurality of cloud service providers and/or one or more virtual devices of the plurality of cloud service providers. For example, the one or more computing workloads may comprise computing workloads caused by operation of software applications.

The one or more computing workloads may comprise one or more computing workloads that are preauthorized for automatic deployment to a plurality of cloud service providers. For example, some preauthorized workloads may have been preauthorized by an authorized entity and/or determined to be preauthorized by one or more machine learning models as described herein. Further, the one or more computing workloads may comprise one or more computing workloads that are not preauthorized for automatic deployment to the plurality of cloud service providers. The one or more computing workloads that are not preauthorized for automatic deployment to the plurality of cloud service providers may comprise one or more workloads that require authorization from an authorized entity each time the one or more workloads are deployed and/or migrated. By way of example, a computing system (e.g., the resource deployment computing platform 102) may retrieve resource data comprising the deployment costs (e.g., deployment costs in United States dollars) and indications of the workloads that are preauthorized for automatic deployment to the plurality of cloud providers. Deployment costs may comprise monetary costs (e.g., United States dollars) and/or energy costs (e.g., an amount of energy measured in kilowatts that may be expended to deploy the one or more computing workloads).

At step 615, a computing system may retrieve cloud service provider data. The cloud service provider data may be retrieved via a cloud API connector. The cloud API connector may be configured to perform real-time retrieval of the cloud service provider data from the plurality of cloud service providers. The cloud service provider data may comprise provider costs of a plurality of cloud service providers. The plurality of cloud service providers may comprise a plurality of computing hardware resources and/or computing software resources on which computing processes of the one or more computing workloads may be performed. For example, the plurality of cloud service providers may comprise computing server devices (e.g., the cloud service provider systems 104) that may be used to process the one or more computing workloads. The provider costs may comprise a cost associated with deploying one or more computing workloads to the cloud service providers. For example, a computing system (e.g., the resource deployment computing platform 102) may retrieve cloud service provider data comprising the deployment costs (e.g., deployment costs in United States dollars) and indications of capabilities and/or capacity of the plurality of cloud providers. Provider costs may comprise monetary costs (e.g., United States dollars) that may be expended to deploy the one or more workloads on the plurality of cloud service provider.

At step 620, a computing system may generate cloud deployment data. Generation of the cloud deployment data may be based on inputting the resource data and/or the cloud service provider data into one or more machine learning models. The cloud deployment data may comprise predicted deployment costs of the plurality of cloud service providers for each of the one or more computing workloads. The predicted deployment costs may comprise one or more monetary costs, energy costs, and/or expenditures of time that are predicted to result from deploying the one or more computing workloads to one or more of the plurality of cloud service providers. For example, the resource deployment computing platform 102 may input the resource data and/or the cloud service provider data into one or more machine learning models 218, which may be configured and/or trained to generate the cloud deployment data.

In some embodiments, the one or more machine learning models may comprise a decision tree model that may be configured based on historical costs of deploying the one or more computing workloads to a plurality of historical cloud service providers. For example, the one or more machine learning model may comprise a decision tree model that is trained based on previous deployments of one or more computing workloads. The previous deployments may be used to determine one or more of the plurality of cloud service providers that may result in reductions in deployment costs.

In some embodiments, the one or more machine learning models may comprise a neural network that is configured to determine, based on the resource data and/or the cloud service provider data, migration costs for each of the plurality of cloud service providers. For example, the one or more machine learning models may determine migration costs that result from one or more computing workloads being offline or operating at a reduced performance level. The predicted deployment costs may comprise the migration costs. For example, the migration costs associated with migration of one or more computing workloads may be added to the costs of deploying the one or more computing workloads on one or more of the plurality of cloud service providers.

At step 625, the computing system may, based on the deployment costs for one or more of the plurality of cloud service providers meeting one or more criteria, perform step 630. For example, a computing system (e.g., the resource deployment computing platform 102) may determine whether one or more of the plurality of cloud service providers meet one or more criteria to deploy the one or more computing workloads to cloud service provider systems 104. Determining whether the one or more criteria have been met may comprise determining whether the predicted deployment costs are less than the deployment costs (e.g., current deployment costs) of the one or more computing workloads by at least a threshold amount. The threshold amount may be a monetary amount (e.g., a savings of $2,000.00) or a proportion (e.g., a deployment cost reduction of five percent). If the one or more criteria are met, step 630 may be performed.

Based on the deployment costs for one or more of the plurality of cloud service providers one or more criteria not being met, step 635 may be performed. For example, a computing system (e.g., the resource deployment computing platform 102) may analyze deployment costs for the plurality of cloud service providers and determine that all of the deployment costs exceed the current costs of deploying the one or more computing workloads.

At step 630, a computing system may migrate or deploy the one or more computing workloads that are preauthorized for automatic deployment to the one or more of the plurality of cloud service providers with the predicted deployment costs that meet the one or more criteria. For example, the resource deployment computing platform 102 may use the resource data to determine the one or more computing workloads that are preauthorized for automatic deployment to the one or more of the plurality of cloud service providers. The resource deployment computing platform 102 may then determine the plurality of cloud service providers that meet the one or more criteria and perform operations to migrate or deploy the one or more computing workloads that are preauthorized for automatic deployment to the one or more of the plurality of cloud service providers that meet the one or more criteria. The resource deployment computing platform 102 may generate commands to authorize the automatic deployment or migration of one or more computing workloads. Further, the resource deployment computing platform 102 may generate commands to migrate one or more computing workloads from the deployed cloud computing systems 106 to lower cost computing systems of cloud service provider systems 104.

At step 635, a computing system may generate indications of the predicted deployment costs resulting from deployment to the plurality of cloud service providers. The indications of the predicted deployment costs may be generated for each of the one or more computing workloads that are not preauthorized for automatic deployment. Further, the indications of the predicted deployment costs may be based on the cloud deployment data. For example, the resource deployment computing platform 102 may generate a message indicating "CLOUD PROVIDER 5 MAY REDUCE THE DEPLOYMENT COSTS OF COMPUTING WORKLOAD 2008 BY SIX PERCENT" that may be displayed on a display device of the resource deployment computing platform 102. The indications of the predicted deployment costs may comprise indications of a difference between the predicted deployment costs and the deployment costs of the one or more computing workloads that are currently deployed. For example, the indications of the predicted deployment costs may comprise an indication that deploying one or more computing workloads on one or more of the plurality of cloud service providers may result in savings of $2,000.00. Interface 502, described with respect to FIG. 5, provides an example of an interface that is configured to display indications of the predicted deployment costs. In some embodiments, the computing system may perform step 605 after completing performance of step 635.

Figure 7:
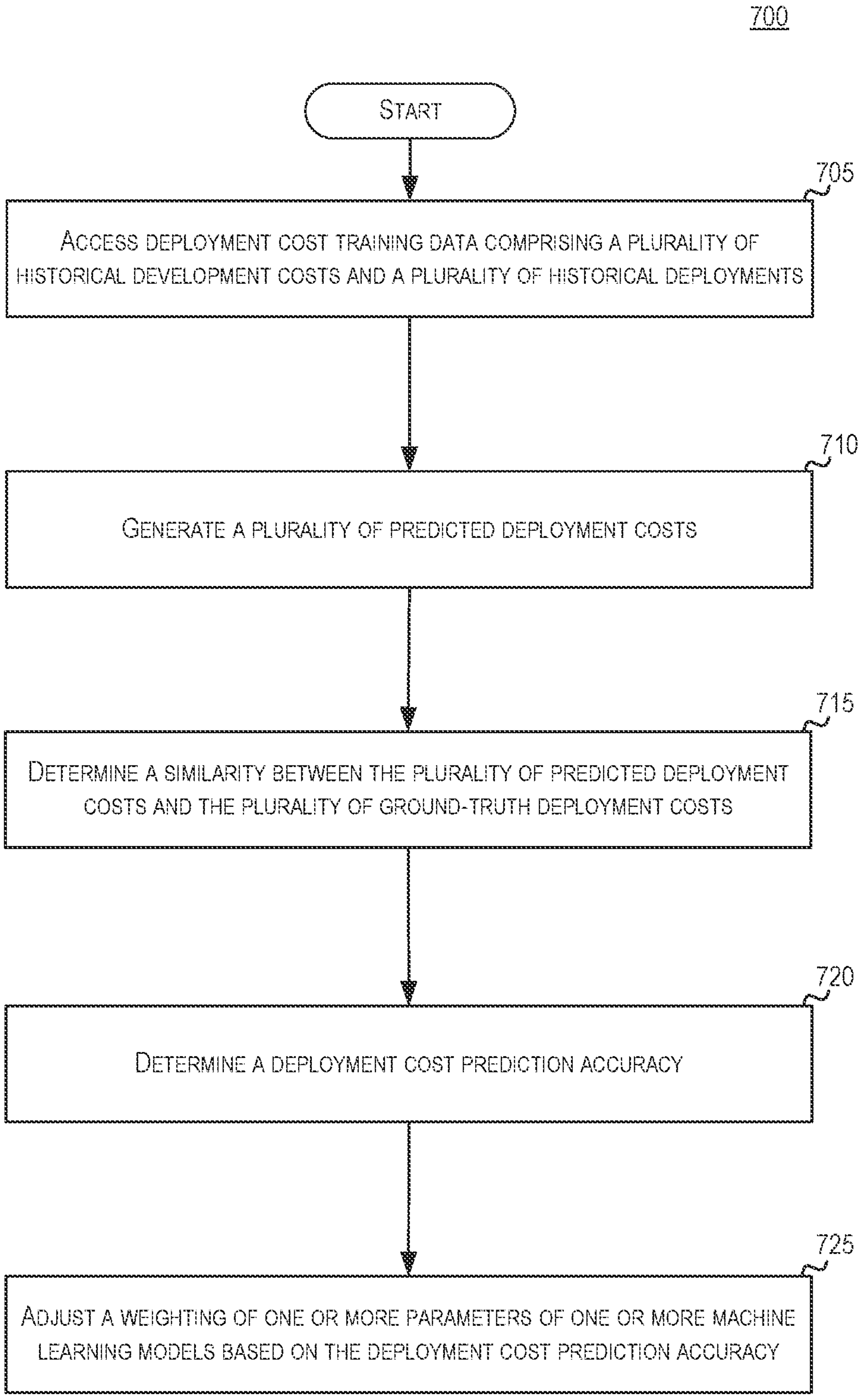
FIG. 7 depicts an illustrative method for automatically training a machine learning model to generate cloud deployment data in accordance with one or more aspects of the disclosure.

FIG. 7 depicts an illustrative method for automatically training a machine learning model to generate cloud deployment data in accordance with one or more aspects of the disclosure. The steps of a method 700 for automatically training a machine learning model to automatically generate cloud deployment data may be implemented by a computing device or computing system (e.g., the resource deployment computing platform 102) in accordance with the computing devices and/or computing systems described herein. One or more of the steps described with respect to FIG. 7 may be omitted, performed in a different order, and/or modified. Further, one or more other steps (e.g., the steps described with respect to FIG. 6) may be added to the steps described with respect to FIG. 7.

At step 705, a computing system may access deployment cost training data. The deployment cost training data may comprise a plurality of historical deployment costs of a plurality of cloud service providers. Further, the deployment cost training data may comprise a plurality of historical deployments of one or more computing workloads. The deployment cost training data may be stored in a storage device of the machine learning model training system 108 or a remote storage system and may be accessed by the machine learning model training system 108 in order to train and/or retrain a machine learning model.

At step 710, a computing system may generate a plurality of predicted deployment costs. Generating the plurality of predicted deployment costs may be based on inputting the deployment cost training data into the one or more machine learning models. The one or more machine learning models may comprise the features and/or capabilities of machine learning models described herein including the machine learning models described with respect to FIG. 3. For example, deployment cost training data may be inputted into one or more machine learning models that are implemented on the machine learning model training system 108. The one or more machine learning models of the machine learning model training system 108 may be configured and/or trained to receive the deployment cost training data and perform one or more operations including analyzing the plurality of historical deployment costs of the plurality of cloud service providers and/or analyzing the plurality of historical deployments of the one or more computing workloads. Further, the one or more machine learning models may generate a plurality of predicted deployment costs. For example, the plurality of predicted deployment costs may be associated with an expense of deploying computing workloads to a cloud service provider. Based on analyzing the historical deployments and historical deployment costs of cloud service providers the one or more machine learning models may generate the plurality of predicted deployment costs.

At step 715, a computing system may determine similarities between the plurality of predicted deployment costs and a plurality of ground-truth predicted deployment costs. Determination of the similarities between the plurality of predicted deployment costs and the plurality of ground-truth predicted deployment costs may be based on one or more comparisons of the plurality of predicted deployment costs to the plurality of ground-truth deployment costs. For example, the machine learning model training system may compare a plurality of predicted deployment costs to a plurality of ground-truth deployment costs that correctly indicate a deployment cost associated with deploying computing workloads on a computing device of a cloud service provider. If the plurality of predicted deployment costs and a plurality of ground-truth deployment costs are similar (e.g., the values of the predicted deployment costs match the ground-truth deployment costs or are within a threshold range of similarity) then the similarity may be determined to be high. If the plurality of predicted deployment costs are different (e.g., the values of the predicted deployment costs do not match the ground-truth deployment costs or are too different from the ground-truth deployment costs) from the plurality of ground-truth predicted deployment costs the similarity may be determined to be low.

At step 720, a computing system may generate, based on the similarity between the plurality of predicted deployment costs and the plurality of ground-truth deployment costs, a deployment cost prediction accuracy of the one or more machine learning models. Generation of the deployment cost prediction accuracy may be based on an extent to which the predicted deployment costs are similar to a ground-truth predicted deployment costs. The deployment cost prediction accuracy may be positively correlated with the similarity between the plurality of predicted deployment costs and the ground-truth predicted deployment costs. Further, the deployment cost prediction accuracy may be based on an amount of similarities between the plurality of predicted deployment costs and the ground-truth deployment costs. A greater number of similarities between the plurality of predicted deployment costs and the ground-truth deployment costs may be positively correlated with a higher deployment cost prediction accuracy. A score or other value may be generated to indicate the deployment cost prediction accuracy. For example, a numerical score between zero and one hundred may be generated. The score may be positively correlated with the predicted deployment costs accuracy and greater similarities between the plurality of predicted deployment costs and the plurality of ground-truth predicted deployment costs may be positively correlated with a higher score.

At step 725, a computing system may adjust a weighting of one or more deployment cost prediction parameters of the one or more machine learning models based on the deployment cost prediction accuracy. For example, the machine learning model training system 108 may increase the weight of the one or more deployment cost prediction parameters that were determined to increase the deployment cost prediction accuracy and/or decrease the weight of the one or more deployment cost prediction parameters that were determined to decrease the deployment cost prediction accuracy. Further, some of the one or more deployment cost prediction parameters may be more heavily weighted than other deployment cost prediction parameters. The weighting of the one or more deployment cost prediction parameters may be positively correlated with the extent to which the one or more deployment cost prediction parameters contributes to increasing the deployment cost prediction accuracy.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system for deploying one or more computing workloads on one or more cloud computing systems, the computing system comprising:

one or more processors; and memory storing computer-readable instructions that, when executed by the one or more processors, cause the computing system to:

retrieve resource data comprising deployment costs of the one or more computing workloads that are currently deployed on the one or more cloud computing systems, wherein the one or more computing workloads comprise one or more computing workloads that are preauthorized for automatic deployment to a plurality of cloud service providers, and one or more computing workloads that are not preauthorized for automatic deployment to the plurality of cloud service providers;

retrieve, via a cloud application programming interface (API) connector, cloud service provider data comprising provider costs of the plurality of cloud service providers;

generate, based on inputting the resource data and the cloud service provider data into one or more machine learning models, cloud deployment data comprising predicted deployment costs of the plurality of cloud service providers for each of the one or more computing workloads;

based on the deployment costs for one or more of the plurality of cloud service providers meeting one or more criteria, deploy the one or more computing workloads that are preauthorized for automatic deployment to the one or more of the plurality of cloud service providers with the predicted deployment costs that meet the one or more criteria; and display, for each of the one or more computing workloads that are not preauthorized for automatic deployment, based on the cloud deployment data, indications of the predicted deployment costs resulting from deployment of a respective computing workload that is not preauthorized for automatic deployment to the plurality of cloud service providers;

access deployment cost training data comprising a plurality of historical deployment costs of the plurality of cloud service providers and a plurality of historical deployments of the one or more computing workloads; and generate, based on inputting the deployment cost training data into the one or more machine learning models, the predicted deployment costs, wherein:

a deployment cost prediction accuracy of the one or more machine learning models is based on a similarity between the predicted deployment costs and a plurality of ground-truth deployment costs, at least one adjustment to a weighting of one or more deployment cost prediction parameters of the one or more machine learning models is based on the deployment cost prediction accuracy, the weighting of the deployment cost prediction parameters that increase the deployment cost prediction accuracy are increased, and the weighting of the deployment cost prediction parameters that decrease the deployment cost prediction accuracy are decreased.

2. The computing system of claim 1, wherein the one or more computing workloads that are preauthorized for automatic deployment are based on inputting the resource data into the one or more machine learning models.

3. The computing system of claim 1, wherein the cloud API connector is configured to perform real-time retrieval of the resource data or the cloud service provider data.

4. The computing system of claim 1, wherein the meeting the one or more criteria comprises the predicted deployment costs being less than the deployment costs of the one or more computing workloads by at least a threshold amount.

5. The computing system of claim 1, wherein the one or more machine learning models comprise a decision tree model configured based on historical costs of deploying the one or more computing workloads to a plurality of historical cloud service providers.

6. The computing system of claim 1, wherein the plurality of cloud service providers comprise a plurality of computing hardware resources or computing software resources on which computing processes of the one or more computing workloads are capable of being executed.

7. The computing system of claim 1, wherein the one or more computing workloads that are preauthorized for automatic deployment are based on whether the one or more computing workloads are critical workloads that require authorization for redeployment.

8. The computing system of claim 1, wherein the one or more computing workloads comprise computing processes executed on one or more physical devices of the plurality of cloud service providers or one or more virtual devices of the plurality of cloud service providers.

9. The computing system of claim 1, wherein the deployment cost prediction accuracy is based on an amount of similarity between the predicted deployment costs and the ground-truth deployment costs.

10. The computing system of claim 1, wherein the indications of the predicted deployment costs comprise indications of a difference between the predicted deployment costs and the deployment costs of the one or more computing workloads that are currently deployed.

11. The computing system of claim 1, wherein the one or more machine learning models comprise a neural network, and deployment costs for each of the plurality of cloud service providers are based on the resource data and the cloud service provider data.

12. The computing system of claim 11, wherein the predicted deployment costs comprise the deployment costs for each of the plurality of cloud service providers.

13. A method executed by a computing device comprising one or more processors for deploying one or more computing workloads on one or more cloud computing systems, the method comprising:

retrieving resource data comprising deployment costs of the one or more computing workloads that are currently deployed on the one or more cloud computing systems, wherein the one or more computing workloads comprise one or more computing workloads that are preauthorized for automatic deployment to a plurality of cloud service providers, and one or more computing workloads that are not preauthorized for automatic deployment to the plurality of cloud service providers;

retrieving via a cloud application programming interface (API) connector, cloud service provider data comprising provider costs of the plurality of cloud service providers;

generating based on inputting the resource data and the cloud service provider data into one or more machine learning models, cloud deployment data comprising predicted deployment costs of the plurality of cloud service providers for each of the one or more computing workloads;

based on the deployment costs for one or more of the plurality of cloud service providers meeting one or more criteria, deploying the one or more computing workloads that are preauthorized for automatic deployment to the one or more of the plurality of cloud service providers with the predicted deployment costs that meet the one or more criteria;

displaying generating, for each of the one or more computing workloads that are not preauthorized for automatic deployment, based on the cloud deployment data, indications of the predicted deployment costs resulting from deployment of a respective computing workload that is not preauthorized for automatic deployment to the plurality of cloud service providers;

accessing deployment cost training data comprising a plurality of historical deployment costs of the plurality of cloud service providers and a plurality of historical deployments of the one or more computing workloads; and generating, based on inputting the deployment cost training data into the one or more machine learning models, the predicted deployment costs, wherein:

a deployment cost prediction accuracy of the one or more machine learning models is based on a similarity between the predicted deployment costs and a plurality of ground-truth deployment costs, at least one adjustment to a weighting of one or more deployment cost prediction parameters of the one or more machine learning models is based on the deployment cost prediction accuracy, the weighting of the deployment cost prediction parameters that increase the deployment cost prediction accuracy are increased, and the weighting of the deployment cost prediction parameters that decrease the deployment cost prediction accuracy are decreased.

14. The method of claim 13, wherein the deployment cost prediction accuracy is based on an amount of similarity between the predicted deployment costs and the ground-truth deployment costs.

15. The method of claim 13, wherein the cloud API connector is configured to perform real-time retrieval of the resource data or the cloud service provider data.

16. The method of claim 13, wherein the one or more computing workloads that are preauthorized for automatic deployment are based on whether the one or more computing workloads are critical workloads that require authorization for redeployment.

17. One or more non-transitory computer-readable comprising instructions that, when executed by a computing platform comprising at least one processor, a communication interface, and memory, cause the computing platform to:

retrieve resource data comprising deployment costs of one or more computing workloads that are currently deployed on one or more cloud computing systems, wherein the one or more computing workloads comprise one or more computing workloads that are preauthorized for automatic deployment to a plurality of cloud service providers, and one or more computing workloads that are not preauthorized for automatic deployment to the plurality of cloud service providers;

retrieve, via a cloud application programming interface (API) connector, cloud service provider data comprising provider costs of the plurality of cloud service providers;

generate, based on inputting the resource data and the cloud service provider data into one or more machine learning models, cloud deployment data comprising predicted deployment costs of the plurality of cloud service providers for each of the one or more computing workloads;

based on the deployment costs for one or more of the plurality of cloud service providers meeting one or more criteria, deploy the one or more computing workloads that are preauthorized for automatic deployment to the one or more of the plurality of cloud service providers with the predicted deployment costs that meet the one or more criteria;

display, for each of the one or more computing workloads that are not preauthorized for automatic deployment, based on the cloud deployment data, indications of the predicted deployment costs resulting from deployment of a respective computing workload that is not preauthorized for automatic deployment to the plurality of cloud service providers;

access deployment cost training data comprising a plurality of historical deployment costs of the plurality of cloud service providers and a plurality of historical deployments of the one or more computing workloads; and generate, based on inputting the deployment cost training data into the one or more machine learning models, the predicted deployment costs, wherein:

a deployment cost prediction accuracy of the one or more machine learning models is based on a similarity between the predicted deployment costs and a plurality of ground-truth deployment costs, at least one adjustment to a weighting of one or more deployment cost prediction parameters of the one or more machine learning models is based on the deployment cost prediction accuracy, the weighting of the deployment cost prediction parameters that increase the deployment cost prediction accuracy are increased, and the weighting of the deployment cost prediction parameters that decrease the deployment cost prediction accuracy are decreased.

* * * * *